United States Patent
Chen (10) Patent No.: US 12,484,092 B2
(45) Date of Patent: Nov. 25, 2025

(54) WIRELESS DEVICE SNOOPING METHOD AND APPARATUS

(71) Applicant: ACTIONS TECHNOLOGY CO., LIMITED, Guangdong (CN)

(72) Inventor: Yuanjie Chen, Guangdong (CN)

(73) Assignee: ACTIONS TECHNOLOGY CO., LIMITED, Guangdong (CN)

(*) Notice: Subject to any disclaimer, the term of this patent is extended or adjusted under 35 U.S.C. 154(b) by 475 days.

(21) Appl. No.: 17/800,636

(22) PCT Filed: Sep. 29, 2020

(86) PCT No.: PCT/CN2020/119100
§ 371 (c)(1),
(2) Date: Aug. 18, 2022

(87) PCT Pub. No.: WO2021/164263
PCT Pub. Date: Aug. 26, 2021

(65) Prior Publication Data
US 2023/0354443 A1    Nov. 2, 2023

(30) Foreign Application Priority Data
Feb. 19, 2020   (CN) .......................... 202010103059.9

(51) Int. Cl.
*H04L 15/22* (2006.01)
*H04W 12/04* (2021.01)
(Continued)

(52) U.S. Cl.
CPC .......... *H04W 76/10* (2018.02); *H04W 12/04* (2013.01); *H04W 76/40* (2018.02)

(58) Field of Classification Search
None
See application file for complete search history.

(56) References Cited

U.S. PATENT DOCUMENTS 10,326,492 B2 * 6/2019 Kim .................. H04L 25/03044
10,412,494 B2 * 9/2019 Tong ..................... H04R 5/033
(Continued)

FOREIGN PATENT DOCUMENTS

CN      104519493 A    4/2015
CN      105245574 A    1/2016
(Continued)

*Primary Examiner* — Sithu Ko
(74) *Attorney, Agent, or Firm* — Foley & Lardner LLP (57) ABSTRACT

A wireless device snooping method includes: a first wireless device establishing a wireless link connection with a data source end, and generating corresponding wireless link parameter(s); and the first wireless device broadcasting the wireless link parameter(s) to trigger at least one second wireless device to receive the wireless link parameter(s) and snoop the wireless link on the basis of the wireless link parameter(s). In this way, in the present disclosure, the first wireless device transmits the wireless link parameter(s) to at least one second wireless device by means of broadcast, thereby breaking through the limitation in the number of second wireless devices, so that a plurality of second wireless devices simultaneously snoop a wireless link, improving the real-time performance and reliability of transmission.

10 Claims, 3 Drawing Sheets

(51) Int. Cl.
*H04W 72/00* (2023.01)
*H04W 76/10* (2018.01)
*H04W 76/40* (2018.01)

(56) References Cited

U.S. PATENT DOCUMENTS

| | | | |
|---|---|---|---|
| 10,912,146 B2* | 2/2021 | Goyal | H04W 4/70 |
| 11,057,911 B2* | 7/2021 | Wang | H04W 76/15 |
| 11,064,281 B1* | 7/2021 | Batta | H04R 1/1041 |
| 11,115,902 B2* | 9/2021 | Sridhara | H04W 48/10 |
| 11,653,398 B2* | 5/2023 | Chen | H04M 1/72412 |
| | | | 455/41.3 |
| 2013/0089085 A1 | 4/2013 | Ben-Moshe et al. | |
| 2015/0181479 A1 | 6/2015 | Lin et al. | |
| 2016/0135042 A1* | 5/2016 | Netto | H04L 63/0428 |
| | | | 380/270 |
| 2019/0174232 A1 | 6/2019 | Tong et al. | |
| 2019/0215879 A1* | 7/2019 | Song | G10L 15/22 |
| 2021/0216274 A1* | 7/2021 | Huang | G06F 3/165 |

FOREIGN PATENT DOCUMENTS

| | | |
|---|---|---|
| CN | 109388364 A | 2/2019 |
| CN | 109391991 A | 2/2019 |
| CN | 110139224 A | 8/2019 |
| CN | 110191442 A | 8/2019 |
| CN | 110493733 A | 11/2019 |

\* cited by examiner

Fig. 1

-- Prior Art --

WIRELESS DEVICE SNOOPING METHOD AND APPARATUS

CROSS-REFERENCE OF RELATED APPLICATIONS

The disclosure is a national phase entry under 35 U.S.C. § 371 of International Application No. PCT/CN2020/119100, filed on Sep. 29, 2020, which claims the priority to Chinese Patent Application No. 202010103059.9, filed with the China National Intellectual Property Administration on Feb. 19, 2020 and entitled "Wireless Device Snooping Method and Apparatus", the entire content of which is hereby incorporated by reference.

FIELD

The disclosure relates to the field of wireless communication technologies, and in particular, to a wireless device snooping method and apparatus.

BACKGROUND

With the continuous development of wireless communication technologies, there are various wireless transmission methods. In the existing audio transmission system, data transmission is usually implemented by the following method.

Figure 1:
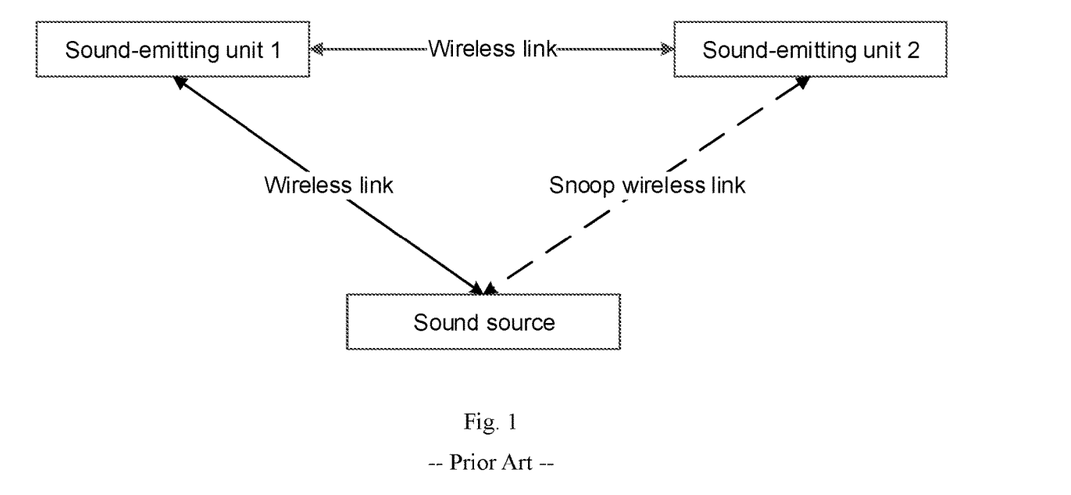
FIG. 1 is a structural schematic diagram of an audio transmission system in the prior art.

Referring to FIG. 1, after establishing a wireless link connection with a sound source, the sound-emitting unit 1 of the stereo then establishes a wireless link connection with the sound-emitting unit 2, so that the sound-emitting unit 2 can obtain corresponding data by snooping link data between the sound-emitting unit 1 and the sound source.

However, for establishing a wireless link connection between the sound-emitting unit 1 and the sound-emitting unit 2, connected point-to-point communication is required, thus creating a certain limitation. For example, if the Bluetooth technology is used, there can be only 7 slave devices due to the limitation of the Bluetooth Piconet, thus the sound-emitting unit 1 can only perform the point-to-point communication with at most 7 devices. For another example, if a wireless mesh network is used, the real-time performance and the reliability of the system will be affected.

BRIEF SUMMARY

A wireless device snooping method includes:
establishing, by a first wireless device, a connection of a wireless link with a data source end, and generating corresponding parameter(s) of the wireless link;
broadcasting, by the first wireless device, the parameter(s) of the wireless link to trigger at least one second wireless device to perform operations of: receiving the parameter(s) of the wireless link and snooping the wireless link based on the parameter(s) of the wireless link.

Optionally, establishing, by a first wireless device, a connection of a wireless link with a data source end, includes:
sending, by the first wireless device, a wireless link connection request to the data source end, and establishing the connection of the wireless link with the data source end when receiving a wireless link connection response fed back by the data source end; or
feeding back, by the first wireless device, a wireless link connection response to the data source end when receiving a wireless link connection request sent by the data source end, to trigger the data source end to establish the connection of the wireless link.

Optionally, after the first wireless device establishes the connection of the wireless link with the data source end, and before the first wireless device broadcasts the parameter(s) of the wireless link, the method further includes:
broadcasting, by the first wireless device, first broadcast configuration information, and triggering the at least one second wireless device to configure data receiving and sending modes based on the first broadcast configuration information.

The at least one second wireless device performs broadcast communication with the first wireless device in the data receiving and sending modes.

Optionally, broadcasting, by the first wireless device, the parameter(s) of the wireless link, includes:
encrypting, by the first wireless device, the parameter(s) of the wireless link by using a preset encryption algorithm, and broadcasting encrypted parameter(s) of the wireless link; or
broadcasting, by the first wireless device, the parameter(s) of the wireless link directly.

Optionally, after the first wireless device broadcasts the parameter(s) of the wireless link, the method further includes:
receiving, by the first wireless device, service data sent by the data source end, and triggering the at least one second wireless device to obtain the service data and execute a corresponding instruction based on the service data.

A wireless device snooping apparatus includes:
a connection unit configured to establish a connection of a wireless link with a data source end, and generate corresponding parameter(s) of the wireless link;
a broadcast unit configured to broadcast the parameter(s) of the wireless link to trigger at least one second wireless device to perform operations of: receiving the parameter(s) of the wireless link and snooping the wireless link based on the parameter(s) of the wireless link.

Optionally, when establishing the connection of the wireless link with the data source end, the connection unit is configured to:
send a wireless link connection request to the data source end, and establish the connection of the wireless link with the data source end when receiving a wireless link connection response fed back by the data source end; or
feed back a wireless link connection response to the data source end when receiving a wireless link connection request sent by the data source end, to trigger the data source end to establish the connection of the wireless link.

Optionally, after establishing the connection of the wireless link with the data source end and before broadcasting the parameter(s) of the wireless link, the broadcast unit is further configured to:
broadcast first broadcast configuration information, and trigger the at least one second wireless device to configure corresponding data receiving and sending modes based on the first broadcast configuration information.

The at least one second wireless device performs broadcast communication with the first wireless device in the data receiving and sending modes.

Optionally, when broadcasting the parameter(s) of the wireless link, the broadcast unit is configured to:
encrypt the parameter(s) of the wireless link by using a preset encryption algorithm, and broadcast encrypted parameter(s) of the wireless link; or broadcast the parameter(s) of the wireless link directly.

Optionally, after broadcasting the parameter(s) of the wireless link, the broadcast unit is further configured to:
receive service data sent by the data source end, and trigger the at least one second wireless device to: obtain the service data and execute a corresponding instruction based on the service data.

A wireless device snooping apparatus includes:
a processor;
a memory for storing instructions that can be executed by the processor.

The processor is configured to execute the instructions to implement the wireless device snooping method described in any one of the above embodiments.

A computer-readable storage medium is provided. Instructions in the computer-readable storage medium, when executed by a processor, enable the processor to perform the wireless device snooping method described in any one of the above embodiments.

In the embodiments of the disclosure, the first wireless device establishes a connection of a wireless link with the data source end, and generates corresponding parameter(s) of the wireless link; the first wireless device broadcasts the parameter(s) of the wireless link, to trigger at least one second wireless device to receive the parameter(s) of the wireless link and snoop the wireless link based on the parameter(s) of the wireless link. The connection of the wireless link is established between the first wireless device and the data source end, so that the second wireless device can obtain the relevant service data by snooping the wireless link between the data source end and the first wireless device. Further, the first wireless device transmits the parameter(s) of the wireless link to at least one second wireless device through broadcasting, so that a plurality of second wireless devices can snoop the wireless link simultaneously, breaking through the limitation on the number of second wireless devices and improving the real-time performance and reliability of transmission.

BRIEF DESCRIPTION OF THE DRAWINGS

In order to illustrate the technical solutions in the embodiments of the disclosure or in the prior art more clearly, the accompanying figures which need to be used in describing the embodiments or the prior art will be introduced below briefly. Obviously, the accompanying figures described below merely illustrate some embodiments of the disclosure, and other accompanying figures can also be obtained by those ordinary skilled in the art according to these accompanying figures without creative labor.

DETAILED DESCRIPTION OF THE EMBODIMENTS

Aiming at the problem of the limitation on the number of wireless devices due to the need to establish a wireless link connection between wireless devices in the prior art, in order to break through the limitation on the number of wireless devices, a solution for snooping wireless devices is provided in the embodiments of the disclosure.

The solution is as follows: a first wireless device establishes a connection of a wireless link with a data source end; and the first wireless device broadcasts parameter(s) of the wireless link to trigger at least one second wireless device to snoop the wireless link based on the parameter(s) of the wireless link.

It should be noted that the disclosure is applicable to all application scenarios in which the wireless broadcast can be realized. For example, if the application scenario is an audio transmission system, the wireless device is a sound-emitting unit, and the data source end is an audio source. If the application scenario is a smart home system, the wireless device is a smart home, and the data source end is a corresponding control device. In the following, for the convenience of description, only the audio transmission system is taken as an example for illustration.

In order to enable those ordinary skilled in the art to better understand the technical solutions of the disclosure, the technical solutions in the embodiments of the disclosure will be described clearly and completely with reference to the accompanying drawings.

Figure 2:
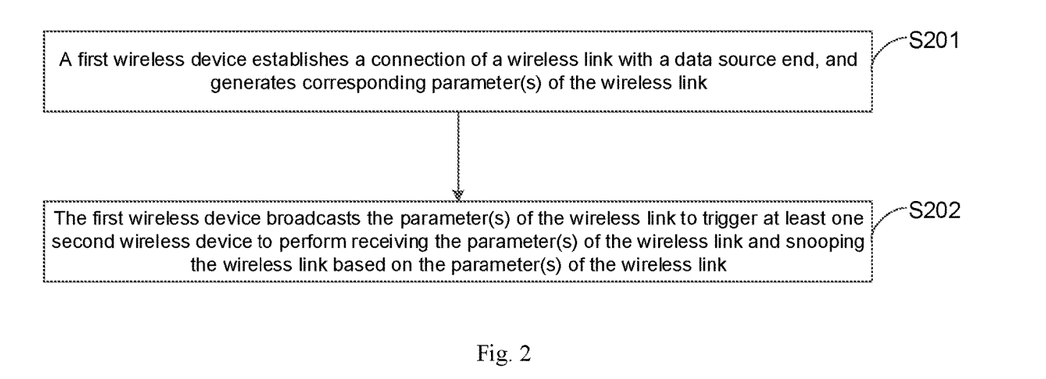
FIG. 2 is a schematic flowchart of a wireless device snooping method provided in an embodiment of the disclosure.

Referring to FIG. 2, a process of a wireless device snooping method provided in an embodiment of the disclosure is as follows.

Step S201: a first wireless device establishes a connection of a wireless link with a data source end, and generates corresponding parameter(s) of the wireless link.

It should be noted that, in the embodiments of the disclosure, when there are a plurality of wireless devices, the wireless device that establishes a wireless link connection with the data source end is called the first wireless device, and the wireless device that has no wireless link connection with the data source end is called the second wireless device.

In some embodiments of the disclosure, the wireless link connection may be established in but not limited to two following ways.

In the first way: the first wireless device sends a wireless link connection request to the data source end.

The first wireless device sends a wireless link connection request to the data source end, and establishes a wireless link connection with the data source end when receiving a wireless link connection response fed back by the data source end.

Figure 3:
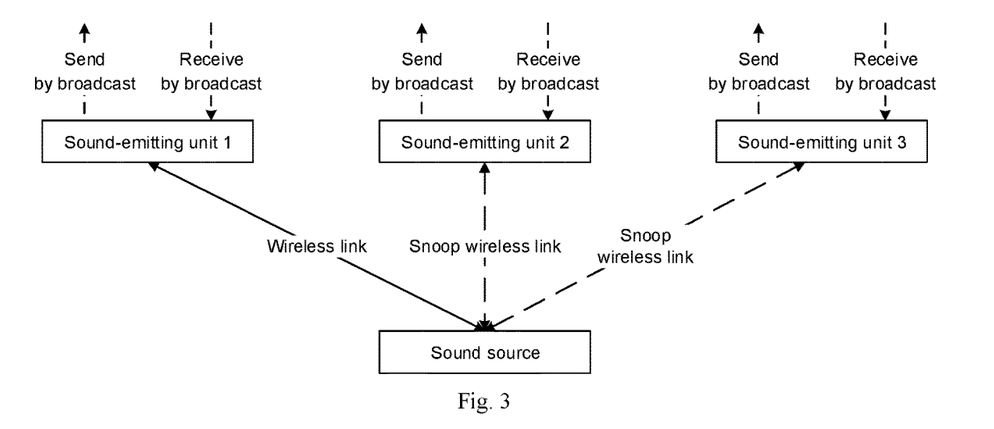
FIG. 3 is a structural schematic diagram of an audio transmission system provided in an embodiment of the disclosure.

For example, referring to FIG. 3, it is assumed that there are only a sound-emitting unit 1, a sound-emitting unit 2 and a sound source. The sound-emitting unit 1 sends a wireless link connection request to the sound source, and establishes a wireless link connection with the sound source when receiving a wireless link connection response fed back by the sound source. In such a case, the sound-emitting unit 1 is the first wireless device, and the sound-emitting unit 2 is the second wireless device.

In the second way: the data source end sends a wireless link connection request to the first wireless device.

The first wireless device feeds back a wireless link connection response to the data source end when receiving a wireless link connection request sent by the data source end, to trigger the data source end to establish a wireless link connection.

For example, referring to FIG. 3, it is assumed that there are only a sound-emitting unit 1, a sound-emitting unit 2 and a sound source. The sound-emitting unit 1 feeds back a wireless link connection response to the sound source when receiving a wireless link connection request sent by the sound source, to trigger the sound source to establish a wireless link connection. In such a case, the sound-emitting unit 1 is the first wireless device, and the sound-emitting unit 2 is the second wireless device.

Further, the first wireless device establishes a wireless link connection with the data source end, and generates corresponding wireless link parameter(s).

It should be noted that, when the first wireless device establishes a wireless link connection with the data source end, it may adopt but not limited to the Wireless-Fidelity (WiFi) technology, Bluetooth technology, Zigbee technology and other existing wireless technology. After the wireless link connection is established, different wireless technologies are used to generate different wireless link parameters, which will not be repeated here.

For example, the sound-emitting unit 1 establishes a wireless link connection with the sound source by using the Bluetooth technology, and generates the corresponding wireless link parameter(s).

Further, after the step S201 is performed, due to different application scenarios, there are, but not limited to, two following cases.

Case 1: the both-way communication is performed between the first wireless device and at least one second wireless device.

In the audio transmission scenario, the first wireless device and the second wireless device are sound-emitting units. In such a case, the both-way communication must be performed between the first wireless device and at least one second wireless device. Next, the Case 1 will be explained by taking the audio transmission scenario as an example.

The first wireless device broadcasts the first broadcast configuration information, and triggers the at least one second wireless device to configure corresponding data sending and receiving modes based on the first broadcast configuration information. The at least one second wireless device performs broadcast communication with the first wireless device in the corresponding data receiving and sending modes.

It should be noted that in embodiments of the disclosure, the first broadcast configuration information at least includes a data receiving mode of the first wireless device and a data sending mode of the first wireless device.

For example, referring to FIG. 3, it is assumed that there are only a sound-emitting unit 1, a sound-emitting unit 2 and a sound source. The first broadcast configuration information includes the data receiving mode of the sound-emitting unit 1 and the data sending mode of the sound-emitting unit 1. The data sending mode of the sound-emitting unit 1 is to be in the data sending state within 0-20 milliseconds (ms), and the data receiving mode of the sound-emitting unit 1 is to be in the data receiving state within 20-30 ms. The sound-emitting unit 1 broadcasts the first broadcast configuration information, and triggers the sound-emitting unit 2 to configure the data receiving mode of the sound-emitting unit 2 to be in the data receiving state within 0-20 ms and the data sending mode of the sound-emitting unit 2 to be in the data sending state within 20-30 ms based on the first broadcast configuration information. The sound-emitting unit 2 performs broadcast communication with the sound-emitting unit 1 in the data receiving mode and the data sending mode of the sound-emitting unit 2.

Further, when the broadcast communication is performed between the first wireless device and the at least one second wireless device, the protocol interaction data for data synchronization and clock synchronization may be transmitted but not limited thereto.

For example, referring to FIG. 3, it is assumed that there are only a sound-emitting unit 1, a sound-emitting unit 2 and a sound source. When the broadcast communication is performed between the sound-emitting unit 1 and the sound-emitting unit 2, the sound-emitting unit 1 broadcasts the local clock and the actual operating clock frequency of the sound-emitting unit 1 to the sound-emitting unit 2 within 0-20 ms, and the sound-emitting unit 2 broadcasts the local clock and the actual operating clock frequency of the sound-emitting unit 2 to the sound-emitting unit 1 within 20-30 ms.

Case 2: the one-way communication is performed between the first wireless device and at least one second wireless device.

If it is determined, according to the actual requirements of the application scenario, that the one-way communication is performed between the first wireless device and the at least one second wireless device, the step S202 may be directly executed.

For example, in the smart home scenario, the first wireless device and the second wireless device are smart homes, and there is no need to perform the both-way communication between the first wireless device and the second wireless device.

Step S202: the first wireless device broadcasts the parameter(s) of the wireless link to trigger at least one second wireless device to perform: receiving the parameter(s) of the wireless link and snooping the wireless link based on the parameter(s) of the wireless link.

It should be noted that different methods are used for snooping due to different wireless networks when the at least one second wireless device snoops the wireless link. Therefore, the disclosure does not limit the implementation of snooping, and the detailed description thereof will be omitted here.

The first wireless device may broadcast the wireless link parameter(s) in but not limited to the following ways.

In the first way: the first wireless device encrypts the wireless link parameter(s) by using a preset encryption algorithm, and broadcasts encrypted wireless link parameter(s).

For example, the sound-emitting unit 1 encrypts the wireless link parameter(s) by using an Advanced Encryption Standard (AES) algorithm, and broadcasts the encrypted wireless link parameter(s).

It should be noted that, in the embodiments of the disclosure, the wireless link parameter(s) may be encrypted by using but not limited to the existing encryption algorithms such as AES algorithm, thus avoiding the leakage of the wireless link parameter(s) effectively, and ensuring the security between the first wireless device and the data source end.

In the second way: the first wireless device broadcasts the wireless link parameter(s) directly.

For example, the sound-emitting unit 1 broadcasts the wireless link parameter(s) directly.

In the second way, the first wireless device broadcasts the wireless link parameter(s) directly without encrypting the broadcast wireless link parameter(s), thus reducing the data processing time and improving the snooping efficiency.

When the first wireless device broadcasts the wireless link parameter(s), at least one second wireless device receives the wireless link parameter(s) in the corresponding data receiving mode, and snoops the wireless link based on the wireless link parameter(s).

For example, referring to FIG. 3, it is assumed that there are only a sound-emitting unit 1, a sound-emitting unit 2 and a sound source. When the sound-emitting unit 1 broadcasts the wireless link parameter(s), the sound-emitting unit 2 receives the wireless link parameter(s) at 10 ms, and snoops the wireless link based on the wireless link parameter(s).

Further, the first wireless device receives the service data sent by the data source end, and triggers the at least one second wireless device to obtain the service data and execute a corresponding instruction based on the service data.

For example, referring to FIG. 3, it is assumed that there are only a sound-emitting unit 1, a sound-emitting unit 2 and a sound source. The sound-emitting unit 1 receives the audio data 1 sent by the sound source, and triggers the sound-emitting unit 2 to obtain the audio data 1 and perform the playback instruction based on the audio data 1.

Further, the first wireless device sends a wireless link connection request to the data source end when it does not receive the service data sent by the data source end within a preset time interval.

For example, assuming that the preset time interval is 2 hours, the sound-emitting unit 1 sends a wireless link connection request to the sound source when it does not receive the service data sent by the sound source within 2 hours.

When establishing a wireless link connection with the data source end again, the first wireless device generates new wireless link parameter(s), and broadcasts the new wireless link parameter(s) based on the first broadcast configuration information, to trigger the at least one second wireless device to receive the new wireless link parameter(s) in the corresponding data receiving mode and snoop the wireless link based on the new wireless link parameter(s).

For example, when establishing a wireless link connection with the sound source again, the sound-emitting unit 1 generates new wireless link parameter(s), and broadcasts the new wireless link parameter(s) at 15 ms based on the first broadcast configuration information, to trigger the sound-emitting unit 2 to receive the new wireless link parameter(s) at 15 ms and snoop the wireless link based on the new wireless link parameter(s).

It should be noted that the broadcast technology used in the embodiments of the disclosure may be any broadcast method implemented by the wireless communication technology, including but not limited to Bluetooth Low Energy (BLE) broadcast, Basic Rate/Enhanced Data Rate (BR/EDR) broadcast, broadcast implemented based on Bluetooth Connectionless Slave Broadcast (CSB), etc.

Next, the disclosure will be described by still taking the audio transmission system as an example. Referring to FIG. 3, there are a sound-emitting unit 1, a sound-emitting unit 2, a sound-emitting unit 3 and a sound source in some embodiments of the disclosure.

The sound-emitting unit 1 sends a wireless link connection request to the sound source, and establishes a connection of a wireless link with the sound source when receiving a wireless link connection response fed back by the sound source. In such a case, the sound-emitting unit 1 is the first wireless device, and the sound-emitting unit 2 and the sound-emitting unit 3 are the second wireless devices.

The sound-emitting unit 1 establishes the connection of the wireless link with the sound source by using the Bluetooth technology, and generates the parameter(s) of the wireless link.

The sound-emitting unit 1 broadcasts the first broadcast configuration information that includes the data receiving mode of the sound-emitting unit 1 and the data sending mode of the sound-emitting unit 1. The data sending mode of the sound-emitting unit 1 is to be in the data sending state within 0-30 ms, and the data receiving mode of the sound-emitting unit 1 is to be in the data receiving state within 30-50 ms. Further, the first broadcast configuration information may also carry the identity information of the sound-emitting unit 1.

Based on the first broadcast configuration information, the sound-emitting unit 2 configures the data receiving mode of the sound-emitting unit 2 to be in the data receiving state within 0-30 ms and the data sending mode of the sound-emitting unit 2 to be in the data sending state within 30-50 ms. Based on the first broadcast configuration information, the sound-emitting unit 3 configures the data receiving mode of the sound-emitting unit 3 to be in the data receiving state within 0-30 ms of the next transmission cycle and the data sending mode of the sound-emitting unit 3 to be in the data sending state within 30-50 ms.

The sound-emitting unit 1 broadcasts the parameter(s) of the wireless link at 15 ms. When the sound-emitting unit 1 broadcasts the parameter(s) of the wireless link, the sound-emitting unit 2 receives the parameter(s) of the wireless link at 15 ms and snoops the wireless link based on the parameter(s) of the wireless link, and the sound-emitting unit 3 receives the parameter(s) of the wireless link and snoops the wireless link based on the parameter(s) of the wireless link in the next transmission cycle.

The sound-emitting unit 1 receives a control instruction 1 sent by the sound source, and triggers the sound-emitting unit 2 and the sound-emitting unit 3 to obtain the control instruction 1 and perform the power-on operation based on the control instruction 1.

Figure 4:
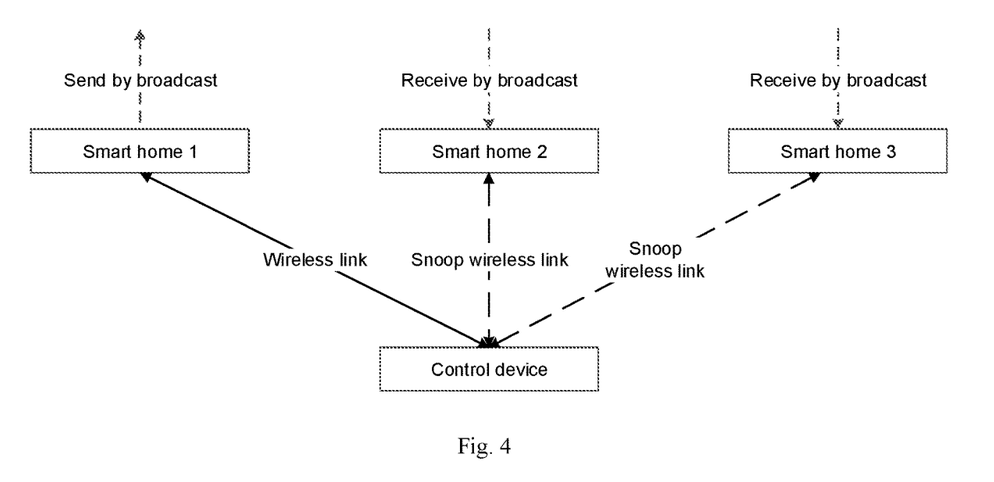
FIG. 4 is a structural schematic diagram of a smart home system provided in an embodiment of the disclosure.

Next, the disclosure will be described by taking a smart home system as an example. Referring to FIG. 4, there are a smart home 1, a smart home 2, a smart home 3 and a control device in some embodiments of the disclosure.

When receiving a wireless link connection request sent by the control device, the smart home 1 feeds back a wireless link connection response to the control device to trigger the control device to establish a connection of a wireless link. The smart home 1 and the control device establish the connection of the wireless link by using the Bluetooth technology, and generate the corresponding parameter(s) of the wireless link.

The smart home 1 broadcasts the parameter(s) of the wireless link, the smart home 2 snoops the wireless link based on the parameter(s) of the wireless link when receiving the parameter(s) of the wireless link, and the smart home 3 snoops the wireless link based on the parameter(s) of the wireless link when receiving the parameter(s) of the wireless link.

The smart home 1 receives a control instruction 2 sent by the control device, and triggers the smart home 2 and the smart home 3 to obtain the control instruction 2 and perform the restart operation based on the control instruction 2.

Figure 5:
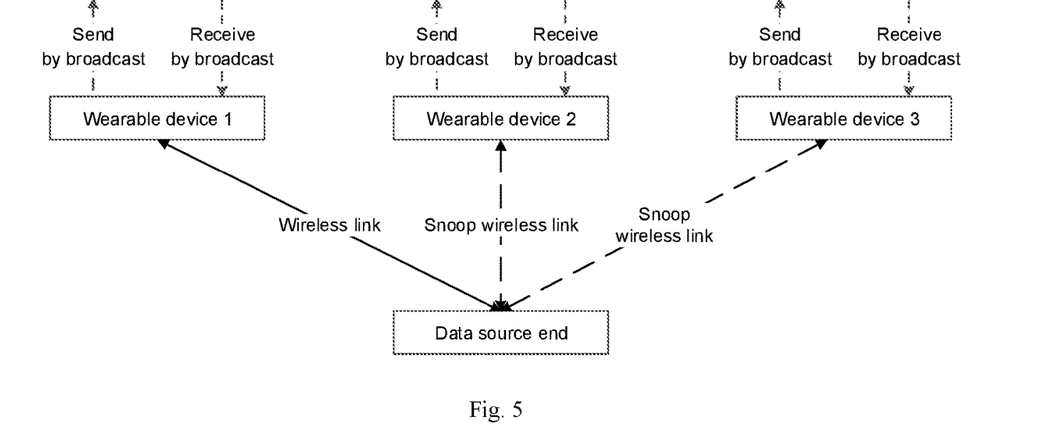
FIG. 5 is a structural schematic diagram of a wearable device system provided in an embodiment of the disclosure.

Next, the disclosure will be described again by taking a wearable device system as an example. Referring to FIG. 5, there are a wearable device 1, a wearable device 2, a wearable device 3 and a data source end in some embodiments of the disclosure.

The wearable device 1 sends a wireless link connection request to the data source end, and establishes a connection of a wireless link with the data source end by using Bluetooth technology when receiving a wireless link connection response fed back by the data source end, and generates corresponding parameter(s) of the wireless link.

The wearable device 1 broadcasts the first broadcast configuration information that includes the data receiving mode of the wearable device 1 and the data sending mode of the wearable device 1. The data sending mode of the wearable device 1 is to be in the data sending state within 0-20 ms, and the data receiving mode of the wearable device 1 is to be in the data receiving state within 20-40 ms. Further, the first broadcast configuration information may also carry the identity information of the wearable device 1.

Based on the first broadcast configuration information, the wearable device 2 configures the data receiving mode of the wearable device 2 to be in the data receiving state within 0-10 ms and the data sending mode of the wearable device 2 to be in the data sending state within 20-30 ms, Then, the wearable device 2 broadcasts the second broadcast configuration information carrying the data receiving mode of the wearable device 2. Based on the first broadcast configuration information and the second broadcast configuration information, the wearable device 3 configures the data receiving mode of the wearable device 3 to be in the data receiving state within 10-20 ms and the data sending mode of the wearable device 3 to be in the data sending state within 30-40 ms.

The wearable device 1 broadcasts the parameter(s) of the wireless link at 8 ms and 18 ms. When the wearable device 1 broadcasts the parameter(s) of the wireless link, the wearable device 2 receives the parameter(s) of the wireless link at 8 ms and snoops the wireless link based on the parameter(s) of the wireless link, and the wearable device 3 receives the parameter(s) of the wireless link at 18 ms and snoops the wireless link based on the parameter(s) of the wireless link.

The wearable device 1 receives a control instruction 3 sent by the data source end, and triggers the wearable device 2 and the wearable device 3 to obtain the control instruction 3 and perform the shutdown operation based on the control instruction 3.

Figure 6:
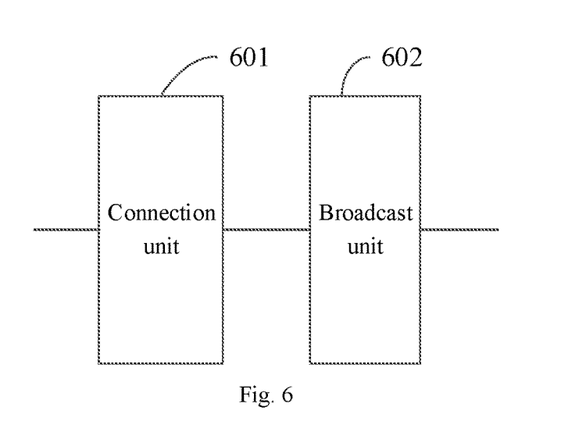
FIG. 6 is a structural schematic diagram of a wireless device snooping apparatus provided in an embodiment of the disclosure.

Based on the same inventive concept, embodiments of the disclosure provide a wireless device snooping apparatus, as shown in FIG. 6, including at least a connection unit 601 and a broadcast unit 602.

The connection unit 601 is configured to establish a connection of a wireless link with a data source end, and generate corresponding parameter(s) of the wireless link.

The broadcast unit 602 is configured to broadcast the parameter(s) of the wireless link to trigger at least one second wireless device to perform operations of: receiving the parameter(s) of the wireless link and snooping the wireless link based on the parameter(s) of the wireless link.

Optionally, when establishing the connection of the wireless link with the data source end, the connection unit 601 is configured to:
send a wireless link connection request to the data source end, and establish the connection of the wireless link with the data source end when receiving a wireless link connection response fed back by the data source end; or
feed back a wireless link connection response to the data source end when receiving a wireless link connection request sent by the data source end, to trigger the data source end to establish the connection of the wireless link.

Optionally, after establishing the connection of the wireless link with the data source end and before broadcasting the parameter(s) of the wireless link, the broadcast unit 602 is further configured to:
broadcast first broadcast configuration information, and trigger the at least one second wireless device to configure corresponding data receiving and sending modes based on the first broadcast configuration information.

The at least one second wireless device performs broadcast communication with the first wireless device in the data receiving and sending modes.

Optionally, when broadcasting the parameter(s) of the wireless link, the broadcast unit 602 is configured to:
encrypt the parameter(s) of the wireless link by using a preset encryption algorithm, and broadcast an encrypted parameter(s) of the wireless link; or
broadcast the parameter(s) of the wireless link directly.

Optionally, after broadcasting the parameter(s) of the wireless link, the broadcast unit 602 is further configured to:
receive service data sent by the data source end, and trigger the at least one second wireless device to obtain the service data and execute a corresponding instruction based on the service data.

Figure 7:
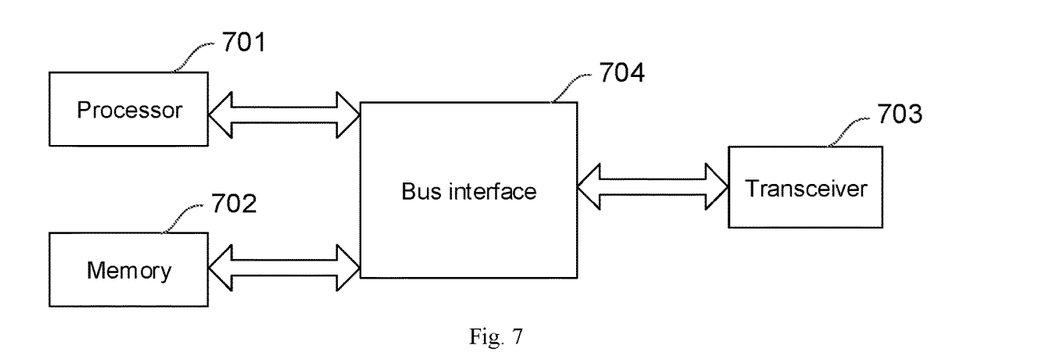
FIG. 7 is a structural schematic diagram of another wireless device snooping apparatus provided in an embodiment of the disclosure.

Based on the same inventive concept, embodiments of the disclosure provide a wireless device snooping apparatus, as shown in FIG. 7, including at least a processor 701, a memory 702, a transceiver 703 and a bus interface 704. The processor 701 is configured to read computer instructions in the memory 702 to perform any method implemented by the wireless device snooping apparatus in the above process.

The processor 701 is responsible for managing the bus architecture and general processing, and the memory 702 may store the data used by the processor 701 when performing the operations. The transceiver 703 is configured to receive and send the data under the control of the processor 701.

The bus architecture may include any numbers of interconnected buses and bridges, and link various circuits of one or more processors represented by the processor 701 and the memory represented by the memory 702. The bus architecture may further link various other circuits such as peripheral device, voltage regulator and power management circuit, which are all well known in the art and thus will not be further described again herein. The bus interface provides an interface.

Based on the same inventive concept, embodiments of the disclosure provide a storage medium. Instructions in the storage medium, when executed by a processor, enable the processor to perform any method implemented by the wireless device snooping apparatus in the above process.

In the embodiments of the disclosure, the first wireless device establishes a wireless link connection with the data source end, and generates the corresponding wireless link parameter(s). The first wireless device broadcasts the wireless link parameter(s), to trigger at least one second wireless device to receive the wireless link parameter(s) and snoop the wireless link based on the wireless link parameter(s). The wireless link connection is established between the first wireless device and the data source end, so that the second wireless device can obtain the relevant service data by snooping the wireless link between the data source end and the first wireless device. Further, the first wireless device transmits the wireless link parameter(s) to at least one second wireless device through broadcasting, so that the plurality of second wireless devices snoop the wireless link simultaneously, breaking through the limitation on the number of second wireless devices and improving the real-time performance and reliability of transmission.

For the system/apparatus embodiments, they are substantially similar to the method embodiments, so the description thereof is relatively simple, and the related parts may refer to the partial illustration of the method embodiments.

It should be noted that the relational terms such as first and second herein are only used to distinguish one entity or operation from another and do not necessarily require or imply any such actual relationship or sequence between these entities or operations.

It should be understood by those skilled in the art that the embodiments of the disclosure can be provided as methods, systems and computer program products. Thus the disclosure can take the form of hardware embodiments alone, software embodiments alone, or embodiments combining the software and hardware aspects. Also, the disclosure can take the form of computer program products implemented on one or more computer usable storage mediums (including but not limited to magnetic disk memory, Compact Disc Read-Only Memory (CD-ROM), optical memory, etc.) containing computer usable program codes therein.

The disclosure is described by reference to the flow charts and/or the block diagrams of the methods, the devices (systems) and the computer program products according to the embodiments of the disclosure. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

Although the preferred embodiments of the disclosure have been described, those skilled in the art can make additional alterations and modifications to these embodiments once they learn about the basic creative concepts. Thus the attached claims are intended to be interpreted to include the preferred embodiments as well as all the alterations and modifications falling within the scope of the disclosure.

Evidently those skilled in the art can make various modifications and variations to the disclosure without departing from the spirit and scope of the disclosure. Thus the disclosure is also intended to encompass these modifications and variations to the disclosure as long as these modifications and variations come into the scope of the claims of the disclosure and their equivalents.

What is claimed is:

1. A wireless device snooping method, comprising:
establishing, by a first wireless device, a connection of a wireless link with a data source end, and generating a corresponding parameter of the wireless link; and
broadcasting, by the first wireless device, the parameter of the wireless link to trigger at least one second wireless device having no wireless link connection with the data source end to perform:
receiving the parameter of the wireless link; and
snooping the wireless link based on the parameter of the wireless link,
wherein after the first wireless device establishes the connection of the wireless link with the data source end, and before the first wireless device broadcasts the parameter of the wireless link, the method further comprises:
broadcasting, by the first wireless device, first broadcast configuration information, for triggering the at least one second wireless device to:
configure data receiving and sending modes based on the first broadcast configuration information,
wherein the first broadcast configuration information is used for the first wireless device to perform broadcast communication with the at least one second wireless device, and the at least one second wireless device performs broadcast communication with the first wireless device in the data receiving and sending modes.

2. The method according to claim 1, wherein:
said establishing, by a first wireless device, the connection of the wireless link with the data source end comprises:
sending, by the first wireless device, a wireless link connection request to the data source end; and
establishing the connection of the wireless link with the data source end when receiving a wireless link connection response fed back by the data source end; or
feeding back, by the first wireless device, a wireless link connection response to the data source end when receiving a wireless link connection request sent by the data source end, for triggering the data source end to establish the connection of the wireless link.

3. The method according to claim 1, wherein:
said broadcasting, by the first wireless device, the parameter of the wireless link comprises:
encrypting, by the first wireless device, the parameter of the wireless link by using a preset encryption algorithm; and
broadcasting an encrypted parameter of the wireless link; or
broadcasting, by the first wireless device, the parameter of the wireless link directly.

4. The method according to claim 1, wherein after the first wireless device broadcasts the parameter of the wireless link, the method further comprises:

receiving, by the first wireless device, service data sent by the data source end; and triggering the at least one second wireless device to obtain the service data and execute a corresponding instruction based on the service data.

5. The method according to claim 1, wherein the broadcast communication between the first wireless device and the at least one second wireless device, comprises communication of protocol interaction data for data synchronization and clock synchronization.

6. A wireless device snooping apparatus, comprising:
a processor;
a memory for storing instructions that can be executed by the processor;
wherein the processor is configured to execute the instructions to implement:
establishing, by a first wireless device, a connection of a wireless link with a data source end, and generating a parameter of the wireless link; and
broadcasting, by the first wireless device, the parameter of the wireless link to trigger at least one second wireless device having no wireless link connection with the data source end to perform:
receiving the parameter of the wireless link; and
snooping the wireless link based on the parameter of the wireless link,
wherein after the first wireless device establishes the connection of the wireless link with the data source end, and before the first wireless device broadcasts the parameter of the wireless link, the processor is configured to execute the instructions to implement:
broadcasting, by the first wireless device, first broadcast configuration information, for triggering the at least one second wireless device to:
configure data receiving and sending modes based on the first broadcast configuration information,
wherein the first broadcast configuration information is used for the first wireless device to perform broadcast communication with the at least one second wireless device, and the at least one second wireless device performs broadcast communication with the first wireless device in the data receiving and sending modes.

7. The apparatus according to claim 6, wherein:
the processor is further configured to execute the instructions to implement:
sending, by the first wireless device, a wireless link connection request to the data source end; and
establishing the connection of the wireless link with the data source end when receiving a wireless link connection response fed back by the data source end; or
feeding back, by the first wireless device, a wireless link connection response to the data source end when receiving a wireless link connection request sent by the data source end, for triggering the data source end to establish the connection of the wireless link.

8. The apparatus according to claim 6, wherein:
the processor is further configured to execute the instructions to implement:
encrypting, by the first wireless device, the parameter of the wireless link by using a preset encryption algorithm; and
broadcasting an encrypted parameter of the wireless link; or
broadcasting, by the first wireless device, the parameter of the wireless link directly.

9. The apparatus according to claim 6, wherein the processor is further configured to execute the instructions to implement:
receiving, by the first wireless device, service data sent by the data source end; and
triggering the at least one second wireless device to obtain the service data and execute a corresponding instruction based on the service data.

10. A non-transitory storage medium, wherein instructions in the storage medium, when executed by a processor, enable the processor to perform a wireless device snooping method, comprising:
establishing, by a first wireless device, a connection of a wireless link with a data source end, and generating a corresponding parameter of the wireless link; and
broadcasting, by the first wireless device, the parameter of the wireless link to trigger at least one second wireless device having no wireless link connection with the data source end to perform:
receiving the parameter of the wireless link; and
snooping the wireless link based on the parameter of the wireless link,
wherein after the first wireless device establishes the connection of the wireless link with the data source end, and before the first wireless device broadcasts the parameter of the wireless link, the method further comprises:
broadcasting, by the first wireless device, first broadcast configuration information, for triggering the at least one second wireless device to:
configure data receiving and sending modes based on the first broadcast configuration information,
wherein the first broadcast configuration information is used for the first wireless device to perform broadcast communication with the at least one second wireless device, and the at least one second wireless device performs broadcast communication with the first wireless device in the data receiving and sending modes.

* * * * *